United States Patent
van den Goor

(10) Patent No.: US 6,283,271 B1
(45) Date of Patent: Sep. 4, 2001

(54) CONVEYOR

(75) Inventor: Jakobus Marie van den Goor, Nuenen (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 09/392,141

(22) Filed: Sep. 9, 1999

(30) Foreign Application Priority Data

Sep. 9, 1998 (NL) .................................................... 1010036

(51) Int. Cl.[7] .................................................... B65G 47/10
(52) U.S. Cl. ............................................................ 198/370.02
(58) Field of Search ........................... 198/370.02, 370.03

(56) References Cited

U.S. PATENT DOCUMENTS

| | | | |
|---|---|---|---|
| 4,817,779 | * 4/1989 | Beck et al. ........................ | 198/370.02 |
| 5,427,223 | * 6/1995 | van den Goor . | |
| 5,435,429 | * 7/1995 | Van Den Goor . | |
| 5,590,995 | * 1/1997 | Berkers et al. . | |
| 5,613,591 | * 3/1997 | Heit et al. ........................ | 198/370.02 |
| 5,657,858 | * 8/1997 | Van Den Goor . | |
| 5,667,054 | * 9/1997 | van den Goor . | |
| 5,695,042 | * 12/1997 | van der Burgt et al. . | |
| 5,826,695 | * 10/1998 | Van Den Goor . | |
| 5,826,704 | * 10/1998 | Van Den Goor . | |
| 5,839,570 | * 11/1998 | Vertogen et al. . | |
| 5,909,797 | * 6/1999 | Van Den Goor . | |
| 5,944,171 | * 8/1999 | Vertogen et al. . | |

FOREIGN PATENT DOCUMENTS

| | | |
|---|---|---|
| 0 444 734 | 9/1991 | (EP) . |
| 0 518 399 | 12/1992 | (EP) . |
| 0 581 397 | 2/1994 | (EP) . |
| 0 626 324 | 11/1994 | (EP) . |

OTHER PUBLICATIONS

U.S. application No. 09/210,805, filed Dec. 15, 1998, pending.*

U.S. application No. 09/147,786, filed Mar. 8, 1999, pending.*

U.S. application No. 09/392,141, filed Sep. 9, 1999, pending.*

* cited by examiner

Primary Examiner—James R. Bidwell
(74) Attorney, Agent, or Firm—Oblon, Spivak, McClelland, Maier & Neustadt, P.C.

(57) ABSTRACT

A conveyor including a drivable endless conveying device having a plurality of carriers extending parallel to each other and transversely to an intended direction of movement of the derivable endless conveying device, a pusher device provided on at least one of the plurality of carriers and configured to move along the at least one of the plurality of carriers, a guide device connected to the pusher device, two guide rails extending to the intended direction of movement of the plurality of carriers and intersecting at an intersection point, the two guide rails forming passages for the guide device, and a switch device provided at the intersection point and including a switch plate, a plurality of guide cams each having a guide surface, and a closing device positioned and configured to make rectilinear movement in a direction substantially perpendicular to a longitudinal direction of the conveyor and alternately close the passages by cooperation of the guide device and the guide surface.

10 Claims, 4 Drawing Sheets

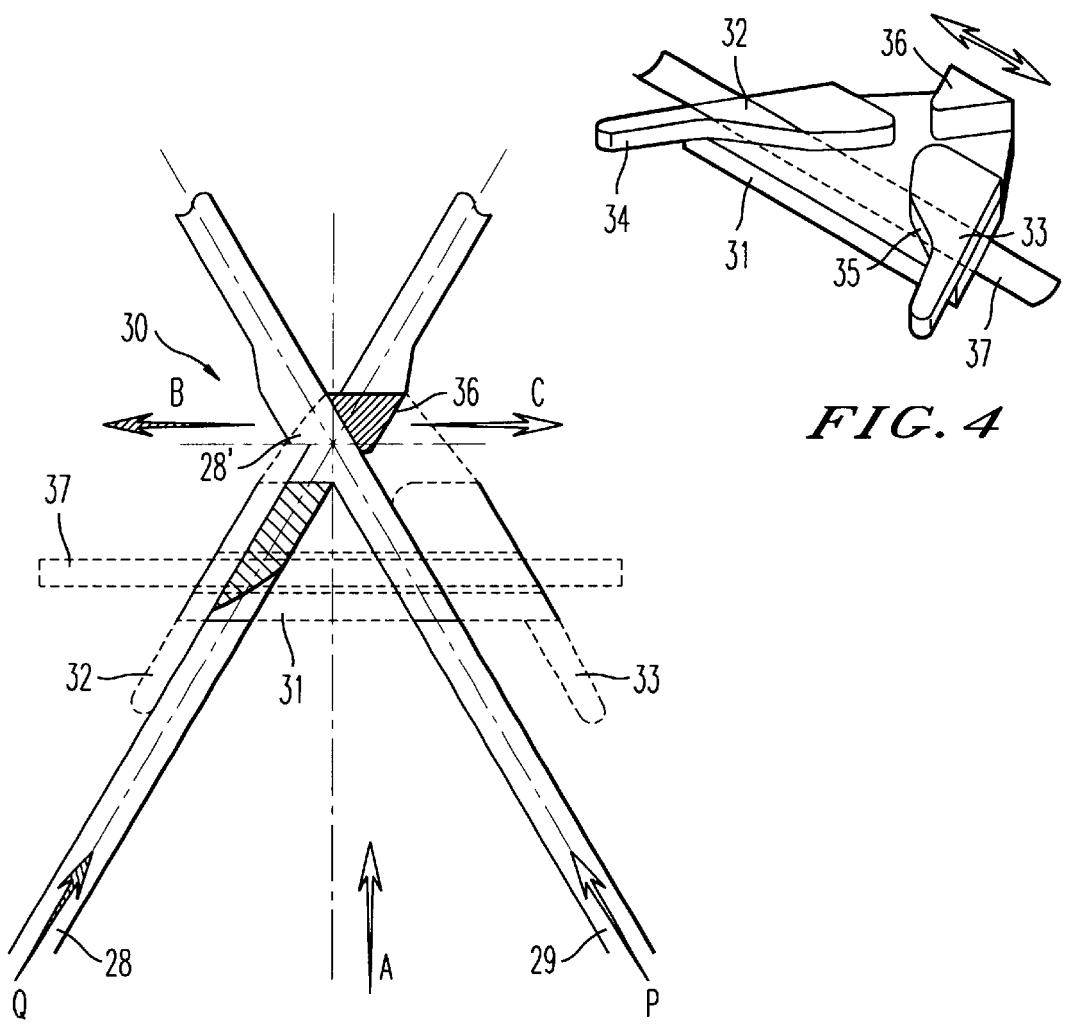
FIG. 3
FIG. 4
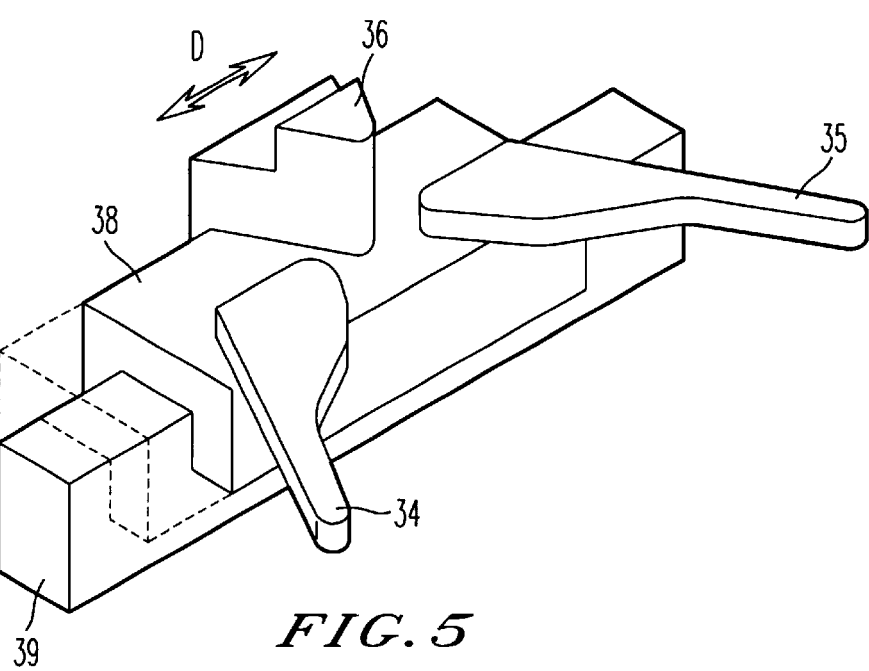
FIG. 5

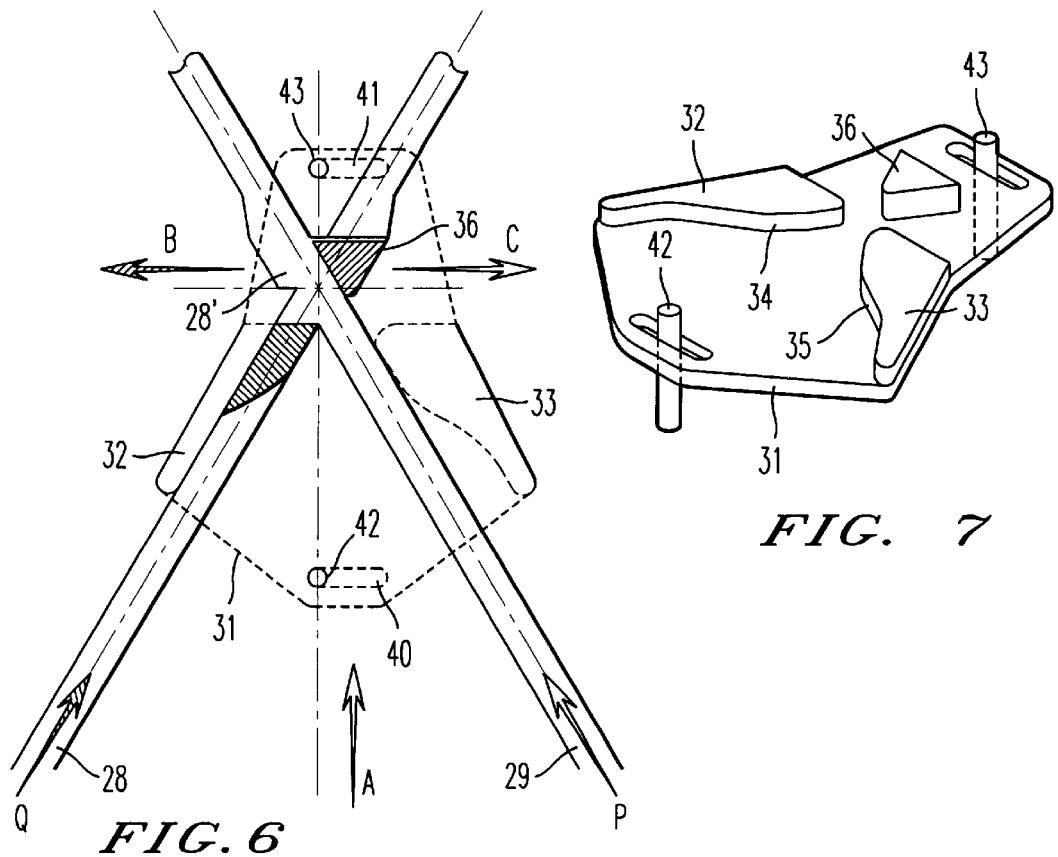
FIG. 6
FIG. 7
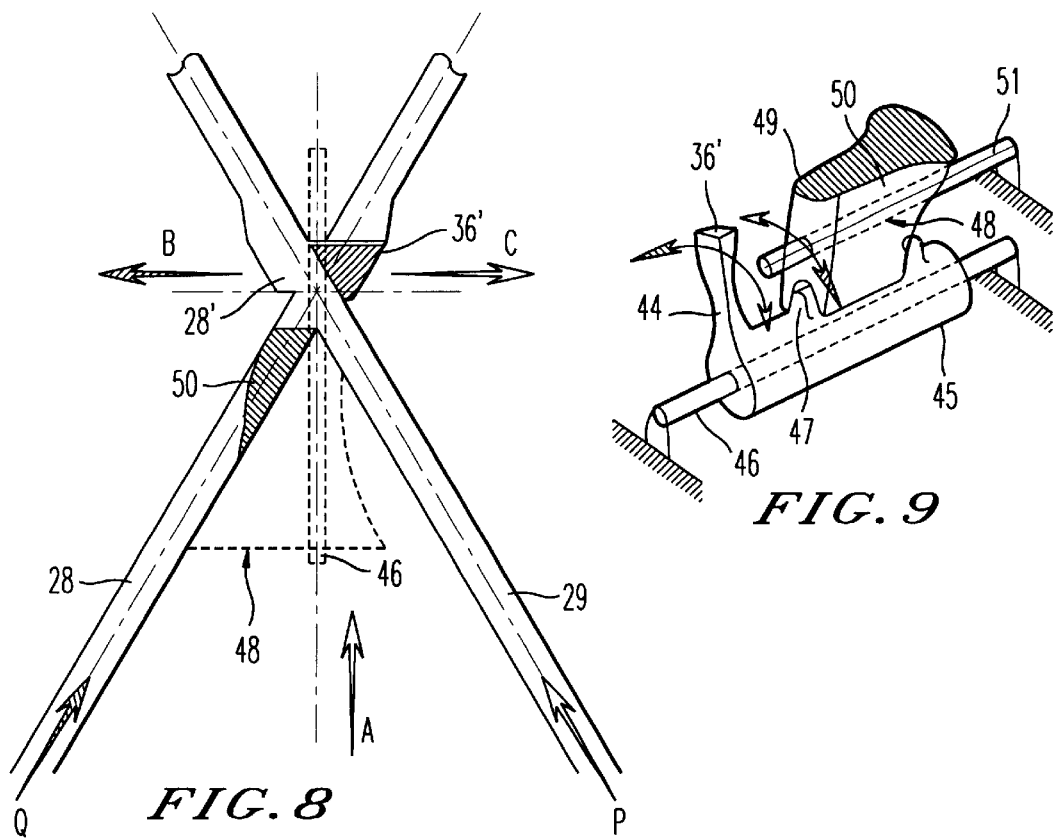
FIG. 8
FIG. 9

CONVEYOR

BACKGROUND OF THE INVENTION

1. Field of the Invention

The invention relates to a conveyor comprising a frame and a derivable, endless conveying device.

2. Discussion of the Background

A conveyor of this type is disclosed in EP-B-0.444.734, whose contents are considered to be incorporated herein by this reference, so that it will not be necessary to give a full description of the construction and the operation of such a conveyor herein. It is noted, however, that the construction according to the present invention can also be used with conveyors whose construction is different from that of the conveyor disclosed in EP-B0.444.734.

The construction as known from said EP-B-0.444.734 is satisfactory per se, but the object of the invention is to provide a conveyor of the above kind wherein a simpler switch construction can be used.

SUMMARY OF THE INVENTION

According to the invention, this objective can be accomplished in that said closing means is disposed in such a manner that it is capable of rectilinear movement in a direction substantially perpendicularly to the longitudinal direction of the conveyor.

By using the construction according to the invention, a simple switch construction can be obtained, wherein the two passages can be closed by means of one closing means.

DETAILED DESCRIPTION OF THE DRAWINGS

The invention will be explained in more detail hereafter with reference to the drawings.

FIG. 1 schematically shows part of a conveyor according to the invention.

FIG. 3 is a schematic plan view of a first embodiment of a switch construction according to the invention.

FIG. 4 is a schematic, perspective view of a modified embodiment of the switch construction which is shown in FIG. 3.

FIG. 5 is a perspective view of a modified embodiment of the switch construction which is shown in FIG. 3.

FIG. 6 is a schematic plan view of a second embodiment of a switch construction according to the invention.

FIG. 7 is a perspective view of a switch plate associated with the switch construction which is shown in FIG. 6.

FIG. 8 is a schematic plan view of a third embodiment of a switch construction according to the invention.

FIG. 9 is a perspective view of parts of the switch construction which is shown in FIG. 8.

DETAILED DESCRIPTION OF THE PREFERRED EMBODIMENTS

Figure 1:
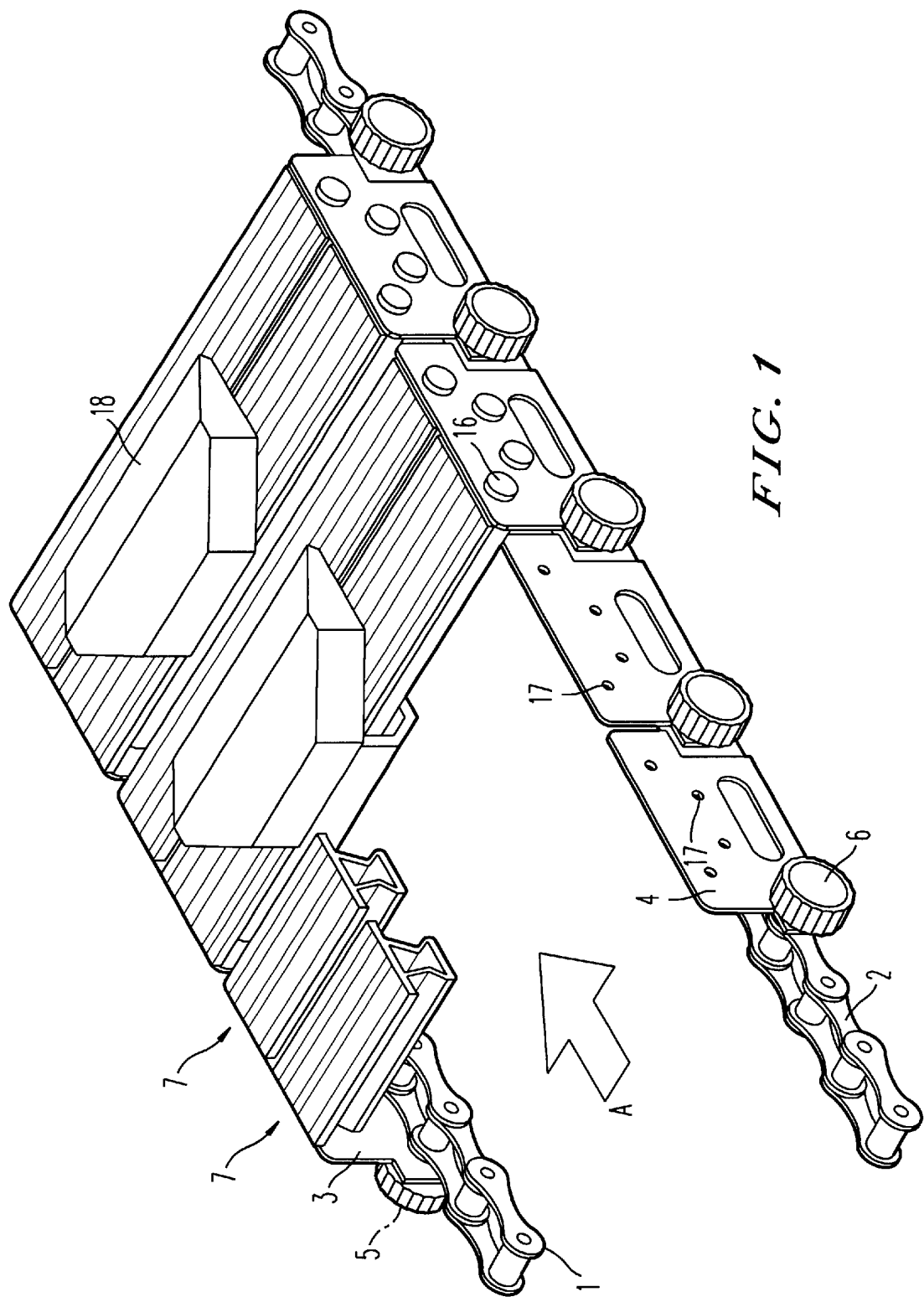

In the embodiment of FIG. 1, the conveyor comprises a drivable, endless conveying means, which includes two endless connecting means in the form of chains 1 and 2. Said endless chains 1 and 2 will be conventionally passed over chain wheels, at least a few of which can be driven so as to move the chains in the direction indicated by arrow A.

Connected to said chains are supporting plates 3 and 4, respectively, which are each pivotally coupled to the respective chains 1 and 2 connected in one point at pivoting points where also guide rollers 5 and 6, respectively, are provided, which guide rollers support chains 1 and 2 on frame parts (not shown).

Provided between supporting plates 3 and 4 are carriers 7 extending parallel to each other, which carriers are connected to said supporting plates by means of pins 16, which are passed through holes 17 formed in said supporting plates.

Connected to at least a number of said carriers 7 are pusher means 18. Pusher means 18 are guided on the respective carriers 7 by means of guide rollers 22 and 25, which are attached to arms 19 and 20 mounted on the underside of the respective pusher means and to a connecting strip 23 which interconnects said arms.

Fixed to the underside of connecting strip 23 is a guide means, which is built up of a wheel 26, which is rotatable about a vertical axis of rotation, and a pin 27 projecting under said wheel.

Figure 2:
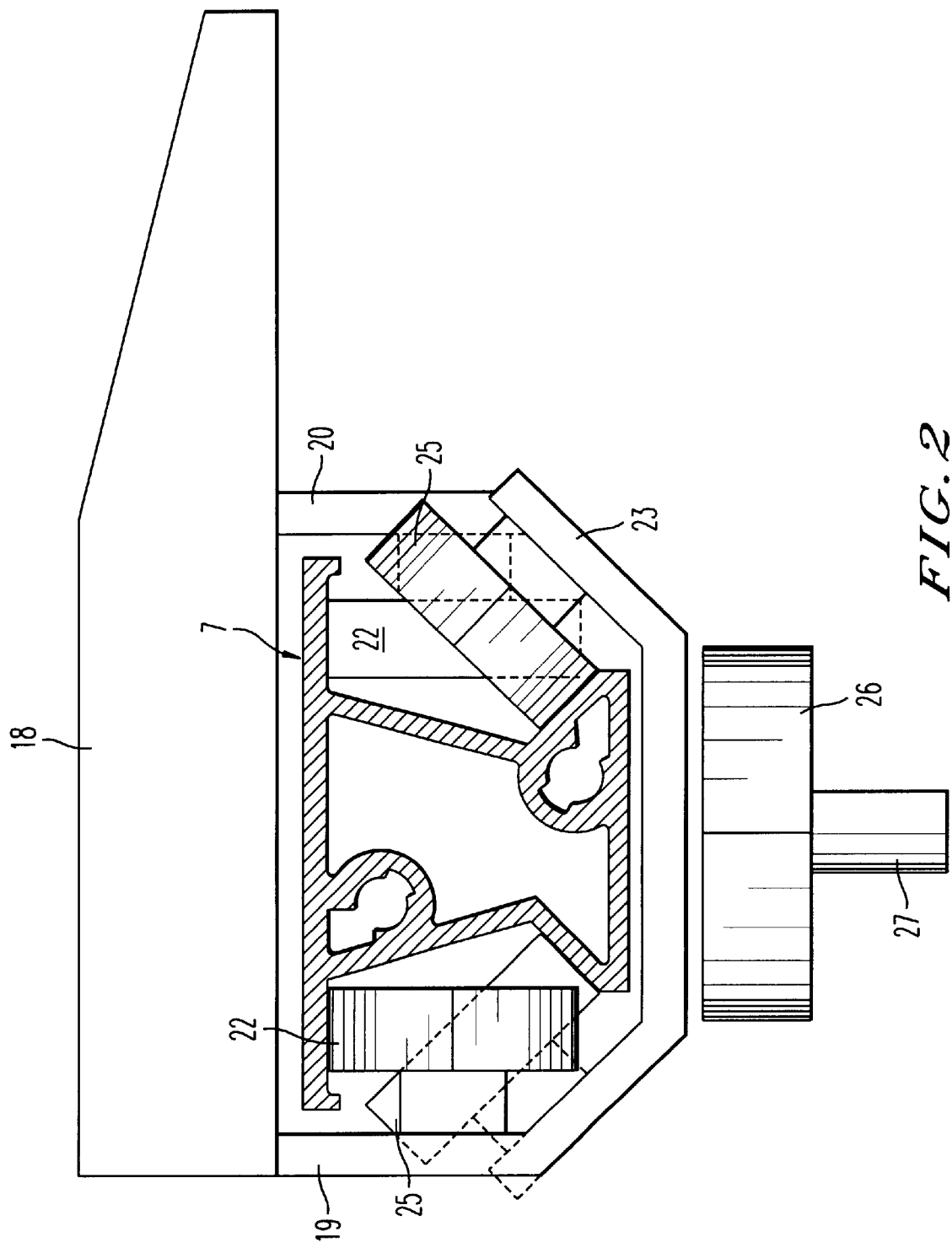
FIG. 2 is a cross-sectional view of a carrier and a pusher means which is movable along said carrier.

A more detailed description of the construction and the operation of the parts which are shown in FIGS. 1 and 2 is given in the aforesaid EP-B-0.444.734.

In order to enable movement of a pusher means 18 along a respective carrier 7 in a desired place, the conveyor is provided in one or more desired places with two guide rails 28 and 29, which extend in opposite directions, at an angle to the intended direction of movement of the carriers according to arrow A, as is shown in FIG. 3.

A switch device 30 is disposed near the intersection of the two guide rails 28 and 29.

In the embodiment according to FIGS. 3 and 4, the switch device comprises a switch means disposed under rails 28 and 29, which switch means is made up of a switch plate 31, to which two guide cams 32 and 33 are fixed. Said guide cams are provided on their facing sides with upright guide surfaces 34 and 35, respectively, which are curvilinear and which are shaped in such a manner that the distance between said guide surfaces 34 and 35 gradually decreases, seen in the intended direction of movement A of carriers 7.

A closing means 36 of trapezoidal shape, seen in plan view, is provided on the switch plate, downstream of the guide cams, seen in the intended direction of movement according to arrow A, whose width gradually increases in the direction of movement as indicated by arrow A. The closing means may also be triangular, for example, instead of trapezoidal.

A bore is furthermore provided in the switch plate, through which a rod 37 fixed to the frame of the conveyor extends. As will be apparent in particular from FIG. 3, said rod 3 extends perpendicularly to the intended direction of movement of the carriers as indicated by arrow A. The construction is thereby such that switch plate 31 is capable of reciprocating sliding movement over said rod, as is indicated by arrows B and C. The switch plate is thereby supported on supporting surfaces (not shown), so that the switch plate cannot pivot about rod 37.

During operation, a pin 27 connected to a pusher means can move through a guide rail 28 or a guide rail 29. When pin 27 moves through rail 29 in the direction indicated by arrow P, whilst the switch plate 31 with the parts connected thereto occupies the position which is illustrated substantially in dotted lines in FIG. 3, the closing means 36 will close an opening provided in said rail near the intersection of rails 28 and 29, as is shown in the figure, and pin 27 can move through the intersection without impediment.

When a pin 27 of a pusher means moves through the rail 28 as indicated by arrow Q, however, whilst switch plate 31 occupies the position which is shown in FIG. 3, the pin 27 connected to the pusher means in question will come into contact with the guide surface 34 of the guide cam 32 fixed to switch plate 31, as a result of which switch plate 31 will be moved from the position which is shown in FIG. 3 in the direction indicated by arrow B. Closing means 36 is likewise moved in the direction indicated by arrow B thereby, to a position in which said closing means 36 will close the opening 28' provided in rail 28 near the intersection of rails 28 and 29 whilst releasing the opening in rail 28 corresponding to opening 28' that is closed by closing means 36 in FIG. 3. Pin 27 will thereby be able to move through the intersection of rails 28 and 29 without being impeded by rail 28.

As is furthermore shown in FIG. 3, pin 27 is thereby positioned approximately near the centre of guide surfaces 34 and 35. It has become apparent that the tendency of switch plate 31 to tilt about rod 37 under the influence of the force exerted on a guide surface via a pin 27 will be minimal with such an embodiment.

Rod 37 may have various cross-sectional shapes, for example round or ellipsoidal, whereby in the latter case the longitudinal axis of the ellipse will preferably extend in vertical direction.

FIG. 5 shows a variant of the embodiment according to FIGS. 3 and 4. As will be apparent from FIG. 5, guide cams 32 and 33 as well as closing means 36 are fixed to a carrier 38 of U-shaped section. Said U-shaped carrier is movably supported by a guide block 39 which is fixedly connected to the frame of the conveyor, which guide block is retained between the two legs of U-shaped carrier 38. It will be apparent that the switch means formed by carrier 38 with guide cams 34 and 35 is thus capable of reciprocating movement over guide block 39, as is indicated by arrow D.

The embodiment which is shown in FIGS. 6 and 7 largely corresponds to the embodiment according to FIGS. 3 and 4, and corresponding parts are therefore indicated by the same numerals in the various figures.

In this embodiment the switch plate 31, whose shape is slightly different from that of the switch plate 31 which is shown in FIGS. 3 and 4, is provided with two parallel, slightly curved slotted holes 40 and 41, which are spaced some distance apart, seen in the intended direction of movement of the carriers as indicated by arrow A, and which extend perpendicularly to said direction of movement. Present in said slotted holes are guide pins 42 and 43, respectively, which are fixedly connected to the frame. It will be apparent that also in this embodiment the switch means can be moved in the direction indicated by arrows B and C, respectively, transversely to the intended direction of movement indicated by arrow A, in a similar manner as in the embodiment according to FIGS. 3 and 4.

In the embodiment which is shown in FIGS. 8 and 9, the closing means 36' is formed by the upper end of an arm 44, which is attached to a bush 45. Bush 45 pivots about a pin 46 supported by the frame of the conveyor, which extends in the intended direction of movement of the carriers indicated by arrow A, as is shown in FIG. 8. The axis of pin 46 thereby coincides with the bisector of the angle between the two rails 28 and 29, seen in plan view in FIG. 8.

Fixed to said bushing 45 is an upwardly extending nose 47, which engages in a recess provided in the underside of a cam-shaped switch means 48, which is provided on opposite sides with two guide surfaces 49 and 50, respectively.

Cam-shaped switch means 48 pivots about a pin 51 which is supported by the frame of the conveyor and which extends parallel to pin 46.

In a first position of the cam-shaped switch means 48, guide surface 50 lies in the path of movement of a pin 27 moving along rail 28. Such a pin 27 moving along rail 28 will cause the cam-shaped means 48 to pivot about pin 51. Said pivoting will cause bush 45 to pivot, thus causing closing means 36' to move from the position of said closing means 36' as shown in FIG. 8 in the direction indicated by arrow B so as to close opening 28' whilst simultaneously releasing a corresponding opening in rail 28.

Due to said pivoting of the cam-shaped means, guide surface 49 will come to lie in the path of movement of a pin 27 moving along rail 29, so that a pin 27 of a pusher means that may be moving along said rail will in turn cause closing means 36' to move in a direction perpendicularly to the intended direction of movement of the carriers with pusher means as indicated by arrow A, and that in the direction indicated by arrow C.

What is claimed is:

1. A conveyor comprising:
   a drivable endless conveying device having a plurality of carriers extending parallel to each other and transversely to an intended direction of movement of the drivable endless conveying device;
   pusher device provided on at least one of said plurality of carriers and configured to move along said at least one of said plurality of carriers,
   a guide device connected to said pusher device;
   two guide rails extending to the intended direction of movement of said plurality of carriers and intersecting at an intersection point, said two guide rails forming passages for said guide device; and
   a switch device provided at the intersection point and including a switch plate, a plurality of guide cams each having a guide surface, and a closing device positioned and losing device positioned and configured to make rectilinear movement in a direction substantially perpendicular to a longitudinal direction of the conveyor and alternately close the passages by cooperation of said guide device and said guide surface.

2. A conveyor according to claim 1, wherein said switch plate is configured to move along at least one supporting device in a direction substantially perpendicular to the longitudinal direction of the conveyor.

3. A conveyor according to claim 1, wherein:
   said switch late is configured to move along at least one rod extending perpendicular to the longitudinal direction of the conveyor; and
   said at least one rod passes through a recess in said switch device.

4. A conveyor according to claim 3, wherein said at least one rod is disposed near a center portion of said guide surfaces.

5. A conveyor according to claim 1, wherein:
   said switch device has a plurality of slotted holes extending perpendicular to the longitudinal direction of the conveyor; and
   each of said plurality of slotted holes extending perpendicular to longitudinal direction of the conveyor; and
   each of said plurality of slotted holes is configured to receive a respective one of pins fixed to the conveyor.

6. A conveyor according to claim 1, wherein said switch plate is movably supported on a supporting beam.

7. A conveyor according to claim 1, wherein:

said guide surfaces form part of guide cams fixed to said switch plate; and the closing device is disposed downstream of the guide cams with respect to the intended direction of movement of said plurality of carriers.

8. A conveyor according to claim 1, wherein said closing device is at least one of a trapezoidal shape and a triangular shape.

9. A conveyor comprising:

a drivable endless conveying device having a plurality of carriers extending parallel to each other and transversely to an intended direction of movement of the drivable endless conveying device;

a pusher device provided on at least one of said plurality of carriers and configured to move along said at least one of said plurality of carriers;

a guide device connected to said pusher device;

two guide rails extending to the intended direction of movement of said plurality of carriers and intersecting at at least one intersection point, said two guide rails forming passages for said guide device; and a switch device provided at the at least one intersection point and including a closing device and a cam-shaped switch, said closing device being mounted on an upper end of an arm configured to pivot about a first pin extending in a longitudinal direction of the conveyor, said cam-shaped switch being configured to pivot about a second pin extending in the longitudinal direction of the conveyor, said cam-shaped switch having two guide surfaces positioned opposite each other and configured to cooperate with said guide device such that said closing device makes a rectilinear movement to alternately close the passages.

10. A conveyor comprising:

drivable endless conveying means for conveying at least one object;

pusher means for pushing the at least one object, said pusher means provided on said drivable endless conveying means;

guide means for guiding said pusher means, said guiding means connected to said pusher means;

two guide rails extending to the intended direction of movement of said drivable endless conveying means and intersecting at at least one intersection point, said two guide rails forming passages for said guide means; and switch means for switching the passage for said guide means, said switch means being provided at the at least one intersection point and including closing means for alternately closing the passages and a cam-shaped switch, said cam-shaped switch being configured to cooperate with said guide means such that said closing means makes a rectilinear movement to alternately close the passages.

* * * * *